United States Patent
Horie et al.

(10) Patent No.: US 11,260,430 B2
(45) Date of Patent: Mar. 1, 2022

(54) ULTRASONIC CLEANER AND AUTOMATIC ANALYZER USING THE SAME

(71) Applicant: Hitachi High-Technologies Corporation, Tokyo (JP)

(72) Inventors: Yosuke Horie, Tokyo (JP); Atsushi Kazama, Tokyo (JP); Tetsuji Kawahara, Tokyo (JP); Takamichi Mori, Tokyo (JP); Kohei Nonaka, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 446 days.

(21) Appl. No.: 16/467,502

(22) PCT Filed: Nov. 15, 2017

(86) PCT No.: PCT/JP2017/041121
§ 371 (c)(1),
(2) Date: Jun. 7, 2019

(87) PCT Pub. No.: WO2018/116705
PCT Pub. Date: Jun. 28, 2016

(65) Prior Publication Data
US 2019/0366391 A1 Dec. 5, 2019

(30) Foreign Application Priority Data
Dec. 20, 2016 (JP) .............................. JP2016-246330

(51) Int. Cl.
*B08B 3/12* (2006.01)
*B01L 3/00* (2006.01)
(Continued)

(52) U.S. Cl.
CPC ................ *B08B 3/12* (2013.01); *B01L 3/508* (2013.01); *B01L 13/00* (2019.08); *B08B 7/028* (2013.01);
(Continued)

(58) Field of Classification Search
None
See application file for complete search history.

(56) References Cited

U.S. PATENT DOCUMENTS

| | | | |
|---|---|---|---|
| 2006/0179946 A1* | 8/2006 | Wilson | B06B 3/02 73/570 |
| 2010/0204617 A1* | 8/2010 | Ben-Ezra | A61N 7/02 601/2 |
| 2018/0161829 A1 | 6/2018 | Horie et al. | |

FOREIGN PATENT DOCUMENTS

| | | | | |
|---|---|---|---|---|
| JP | 60-042635 A | | 3/1985 | |
| JP | 60042635 A | * | 3/1985 | ......... G01N 35/1004 |

(Continued)

OTHER PUBLICATIONS

International Search Report of PCT/JP2017/041121 dated Feb. 13, 2018.

*Primary Examiner* — Kathryn Wright
(74) *Attorney, Agent, or Firm* — Mattingly & Malur, PC

(57) ABSTRACT

An ultrasonic cleaner includes: a cleaning tank; an ultrasonic transducer; a vibration head which extends from the ultrasonic transducer toward the cleaning tank and of which a tip portion includes a cylindrical hole having a longitudinal direction aligned to a vertical direction; and an air layer or a metallic member that is provided in an area formed by projecting at least the vibration head in the vertical direction under the cleaning tank, wherein the ultrasonic transducer is driven at a frequency at which the vibration head is vibrated resonantly in a vibration mode accompanied by a deformation in the longitudinal direction of the cylindrical hole and (Continued)

a direction perpendicular to the longitudinal direction, wherein an area formed by projecting at least the vibration head in the vertical direction in a bottom portion of the cleaning tank is formed of a material mainly including resin.

16 Claims, 11 Drawing Sheets

(51) Int. Cl.
  *B08B 7/02* (2006.01)
  *G01N 35/10* (2006.01)
(52) U.S. Cl.
  CPC ...... *G01N 35/1004* (2013.01); *B01L 2300/06* (2013.01); *B01L 2300/0858* (2013.01)

(56) References Cited

FOREIGN PATENT DOCUMENTS

| | | |
|---|---|---|
| JP | 04-169850 A | 6/1992 |
| JP | 5-50362 U | 7/1993 |
| JP | 2002-329693 A | 11/2002 |
| JP | 2008-043842 A | 2/2008 |
| JP | 2009-011879 A | 1/2009 |
| WO | 2017/002740 A1 | 1/2017 |

\* cited by examiner

CROSS-SECTIONAL VIEW B-B'

ULTRASONIC CLEANER AND AUTOMATIC ANALYZER USING THE SAME

TECHNICAL FIELD

The present invention relates to an ultrasonic cleaner which cleans a nozzle for dispensing a sample such as serum or urine, and an automatic analyzer that includes an ultrasonic cleaner and analyzes components by mixing the sample and a reagent.

BACKGROUND ART

In an automatic analyzer, the same nozzle is repeatedly used to dispense the samples. Therefore, the tip end of the nozzle is cleaned before sucking another sample. If the tip end of the nozzle is not sufficiently cleaned, the component of the previous sample is carried over to the next sample, and the measurement accuracy is worsened. However, the automatic analyzer having a high throughput performance performs the dispensing process at a high speed. Therefore, sufficient time is not spent for cleaning the nozzle. PTL 1 discloses that the sample deposit of the nozzle is removed by cavitation generated in the liquid by using an ultrasonic cleaner provided with a Langevin vibrator at the bottom portion of the cleaning tank.

CITATION LIST

Patent Literature

PTL 1: JP 4-169850 A

SUMMARY OF INVENTION

Technical Problem

In the cleaner using the ultrasonic wave, a driving frequency of an ultrasonic transducer is set to a low frequency (20 to 100 kHz) for dirt hard to remove. The cavitation generated in the liquid (a phenomenon in which bubbles are generated and extinguished by a pressure difference generated in the liquid) is utilized for cleaning at a low frequency. However, the cavitation is not uniformly generated in the liquid, and the strength of the cavitation is also changed according to the intensity of the ultrasonic wave. An interval between areas where the intensity of the ultrasonic wave is increased is different depending on the driving frequency, and an area where cavitation is strong is formed for each distance obtained by dividing the sound velocity in the liquid (about 1,500 m/s in water) by the driving frequency of the ultrasonic transducer. For example, when the driving is performed at 50 kHz, a standing wave of one wavelength of mm ($\lambda$) is generated, there comes an area where the cavitation strength becomes strong at an interval of 15 mm ($\lambda/2$) (half wavelength). In addition, the area near the vibration surface generating the ultrasonic wave also has a strong cavitation strength.

Therefore, in the ultrasonic cleaner provided with the Langevin vibrator in the lower portion of the cleaning tank as described in PTL 1, when the driving is performed at 20 to 100 kHz to obtain the effect of the cavitation, the strong cavitation areas are generated at an interval of 7.5 mm (100 kHz driving) to 37.5 mm (20 kHz driving). The cavitation strength becomes stronger as closing to a vibrator (driving source). In addition, a range of the area of the strong cavitation is narrow. Therefore, a cleaning range of the nozzle is restricted, and a cleaning irregularity easily occurs. Further, the ultrasonic cleaner provided with the vibrator in the lower portion of the cleaning tank is configured such that the bottom portion of a stainless vessel vibrates using the vibrator so as to generate the ultrasonic wave in the inner liquid. Therefore, the area of the bottom portion becomes large. In addition, the liquid level of at least 7.5 mm ($\lambda/4$) or more is necessary to generate the standing wave. In other words, the ultrasonic cleaner in the related art requires a large area of the bottom surface and a height. Therefore, a large amount of cleaning solution is increased to effectively perform cleaning by generating the standing wave. In particular, in a device having a problem in that a sample is carried over, the cleaning solution is replaced whenever the nozzle is cleaned, so there is a need to prevent the sample from attaching again to the nozzle. Therefore, it is desired to set the amount of cleaning solution to be low.

Therefore, the invention is to provide an ultrasonic cleaner including a cleaning tank generating a standing wave in a liquid even at a low liquid level in addition to a configuration of a vibration unit capable of cleaning a nozzle tip (particularly an outer periphery) in a range of a driving frequency of 20 to 100 kHz, and an automatic analyzer using the ultrasonic cleaner.

Solution to Problem

According to an ultrasonic cleaner of a first aspect, there is included a cleaning tank for storing a cleaning solution, an ultrasonic transducer, a vibration head which extends from the ultrasonic transducer toward the cleaning tank and of which a tip portion includes a cylindrical hole having a longitudinal direction aligned to a vertical direction, and an air layer or a metallic member that is provided in an area formed by projecting at least the vibration head in the vertical direction under the cleaning tank, wherein the ultrasonic transducer is driven at a frequency at which the vibration head is vibrated resonantly in a vibration mode accompanied by a deformation in the longitudinal direction of the cylindrical hole and a direction perpendicular to the longitudinal direction, wherein an area formed by projecting at least the vibration head in the vertical direction in a bottom portion of the cleaning tank is formed of a material mainly including resin, and wherein a height of the cleaning solution stored in the cleaning tank is shorter than ¼ of a wavelength obtained by a sound velocity and the frequency driving the ultrasonic transducer.

According to an ultrasonic cleaner of a second aspect, there is provided, a cleaning tank which stores a cleaning solution, an ultrasonic transducer, and a vibration head which extends from the ultrasonic transducer toward the cleaning tank and of which a tip portion includes a cylindrical hole having a longitudinal direction aligned to a vertical direction. The ultrasonic transducer is driven at a frequency at which the vibration head is vibrated resonantly. A part or the entirety of the cleaning tank is formed of a material mainly including a resin, and wherein an air layer or a metallic member is provided at a distance of an integer times ¼ of a wavelength obtained by a sound velocity and a frequency driving the ultrasonic transducer from an area which is an antinode of an ultrasonic wave generated by the resonant vibration of the vibration head through a cleaning tank portion formed of the material mainly including a resin in a deformation direction of the vibration head when the vibration head is vibrated resonantly In addition, the ultrasonic cleaner according to the first or second aspect is mounted an automatic analyzer.

Advantageous Effects of Invention

According to the first aspect, there is provided a mechanism which accelerates a vibration in a Z direction of a vibration head which resonantly vibrates in a secondary vibration mode, so that a high cleaning effect is realized while the amount of cleaning solution is reduced.

According to a second aspect, a high cleaning effect is realized by reducing a vibration load at the time of resonant vibration of a vibration head.

DESCRIPTION OF EMBODIMENTS

Hereinafter, embodiments of the invention will be described in detail with reference to the drawings.

Figure 1A:
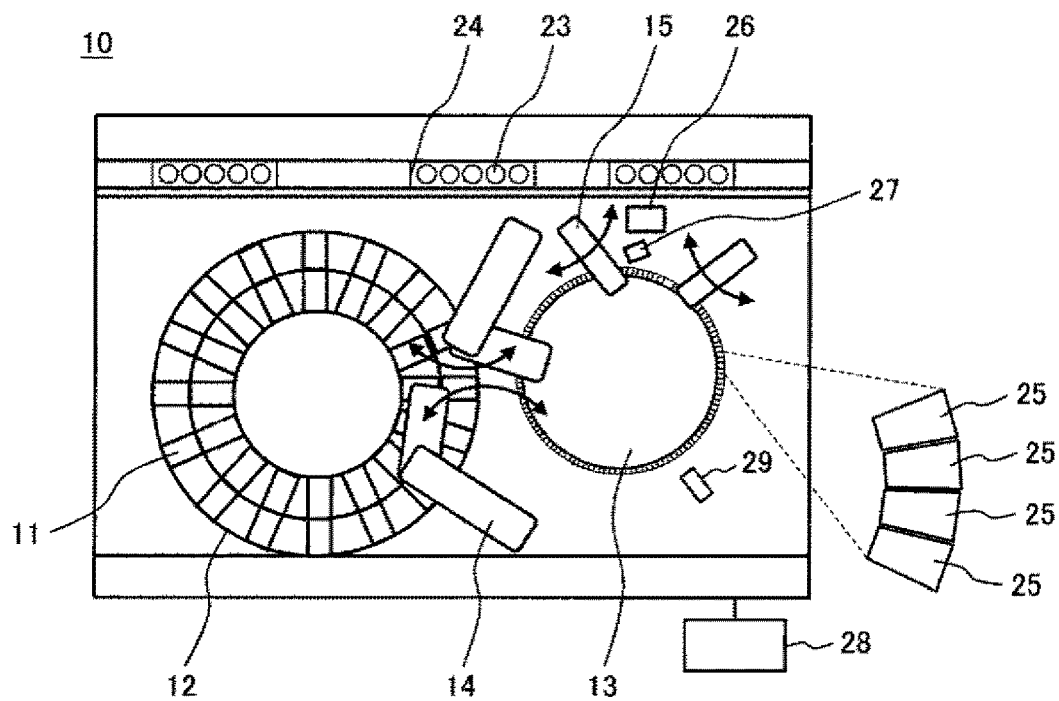
FIG. 1A is a diagram (a top view) illustrating an automatic analyzer including an ultrasonic cleaner.

FIG. 1A is a diagram illustrating a configuration an automatic analyzer according to this embodiment. An automatic analyzer 10 includes a reagent disk 12 which mounts a plurality of reagent containers 11, a reaction disk 13 which mixes a reagent and a sample by a reaction cell 25 to measure the reaction, a reagent dispensing mechanism 14 which sucks and discharges the reagent, and a sample dispensing mechanism 15 which sucks and discharges the sample.

Figure 1B:
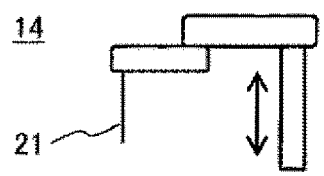
FIG. 1B is a configuration example of a reagent dispensing mechanism.
Figure 1C:
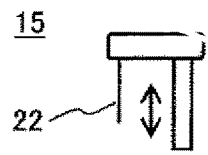
FIG. 1C is a configuration example of a sample dispensing mechanism.

The reagent dispensing mechanism 14 includes a reagent nozzle 21 to dispense the reagent (FIG. 1B), and the sample dispensing mechanism 15 includes a sample nozzle 22 to dispense the sample (FIG. 1C). The sample inserted to the device is mounted in a rack 24 and conveyed in the state of being contained in a sample container (test pipe) 23. A plurality of sample containers 23 are mounted in the rack 24. Further, the sample is a sample taken out of blood such as serum or whole blood, or urine.

The sample dispensing mechanism 15 rotatably moves the nozzle 22 to the cleaning tank 27 to clean a suction position where the sample is sucked from the sample container 23, a discharge position at which the discharge to the cell 25 is performed, a cleaning position at which the tip end of the nozzle 22 is cleaned by an ultrasonic cleaner 26, and the tip end of the nozzle 22 to which a cleaning solution is attached by cleaning with the ultrasonic cleaner 26 with water. Further, the sample dispensing mechanism 15 falls down the nozzle 22 to meet the heights of the sample container 23, the reaction cell 25, the ultrasonic cleaner 26, and the cleaning tank 27 at the suction position, the discharge position, and the cleaning position. In order to perform such an operation, the sample dispensing mechanism 15 is configured to be able move the nozzle 22 to a target position and move up and down. In this embodiment, the ultrasonic cleaner 26 is provided to clean the nozzle 22 of the sample dispensing mechanism 15. Further, an ultrasonic cleaner may be provided to clean the nozzle 21 of the reagent dispensing mechanism 14.

The automatic analyzer 10 includes a measurement unit 29, and performs photometry on the mixture of the sample and the reagent contained in the reaction cell 25 so as to analyze a concentration of a predetermined component in the sample. The measurement unit 29 includes, for example, a light source and a photometer (absorptiometer, light-scattering photometer, etc.). In addition, a control unit 28 controls the nozzle movement, the suction of the sample, the liquid supply to the cleaning tank 27, the driving of the ultrasonic cleaner 26, and various other mechanisms. Further, the automatic analyzer includes an operation unit (PC, control substrates, etc.) to operate the device, and a device which includes a unit to insert and collect the rack 24 by a laboratory technician while these are omitted in FIG. 1A.

Figure 1D:
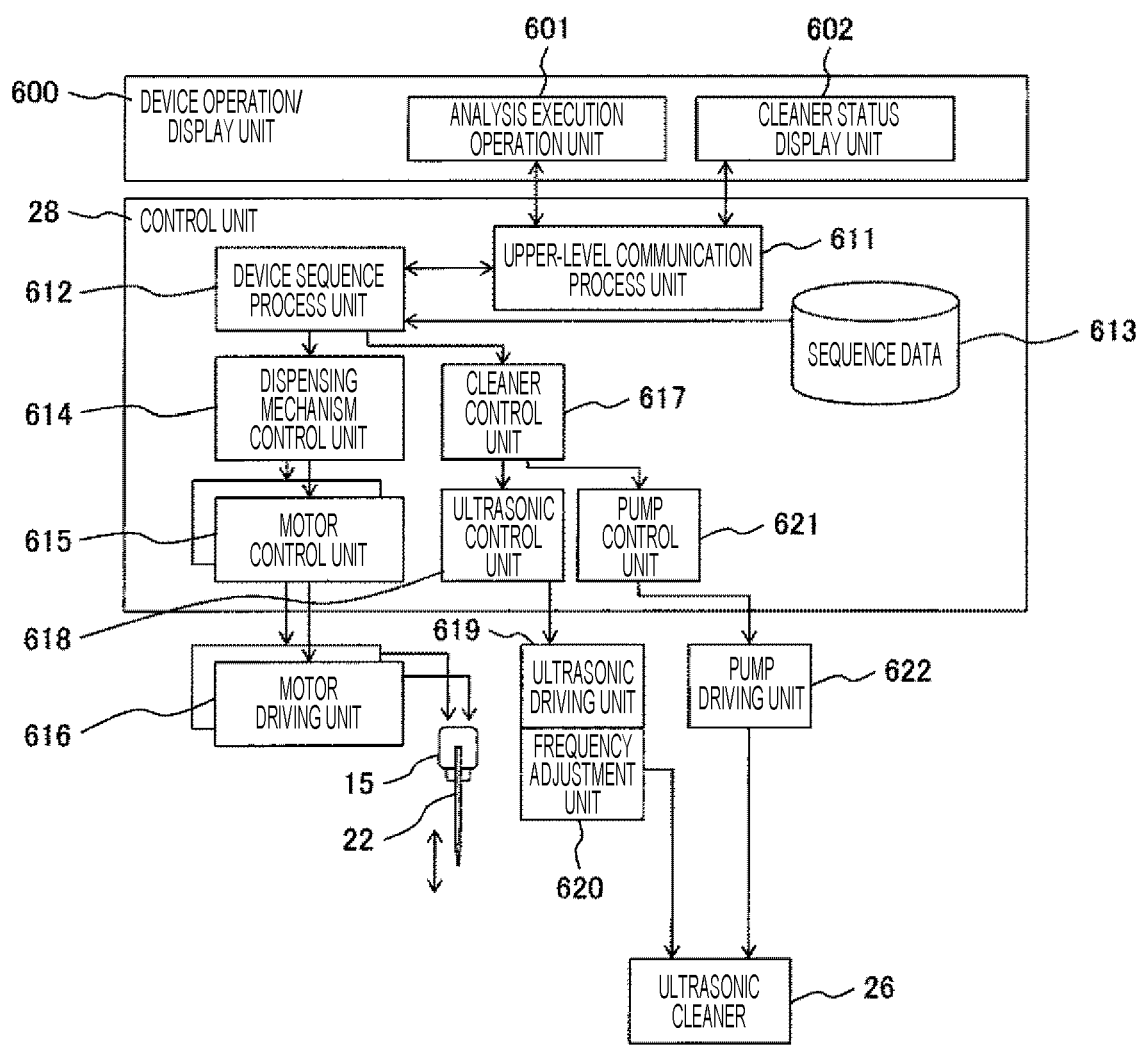
FIG. 1D is a configuration example of a control unit.

FIG. 1D illustrates an exemplary configuration of the control unit 28 of the dispensing mechanism and the cleaner of the automatic analyzer 10. In an operation screen of the automatic analyzer 10, a device operation/display unit 600 is provided, and there is included an analysis execution operation unit 601 to perform inspection and a cleaner state display unit 602 to display the state of the ultrasonic cleaner 26. The control unit 28 to control the device receives a command from the device operation/display unit 600 from an upper-level communication process unit 611. A device sequence process unit 612 controls the dispensing mechanism 15 and the ultrasonic cleaner 26 on the basis of the sequence date of a sequence database 613.

A dispensing mechanism control unit 614 rotates and moves the dispensing mechanism 15 up and down through a motor control unit 615 and a motor driving unit 616 to move the nozzle 22. A cleaner control unit 617 controls an ultrasonic driving unit (an amplifier for a piezoelectric element) 619 through an ultrasonic control unit 618, and drives an ultrasonic transducer 205 which includes the ultrasonic cleaner 26 (turning the ultrasonic wave ON/OFF). Further, a resonant characteristic of the ultrasonic transducer 205 varies depending on heat. Therefore, a frequency adjustment unit 620 changes a driving frequency in accordance with the change in resonance frequency.

Further, the cleaner control unit 617 sends an instruction to a pump control unit 621, and drives a pump through which a pump driving unit 622 is connected to the cleaning tank of the ultrasonic cleaner 26, and controls the replacing of the cleaning solution.

Figure 2A:
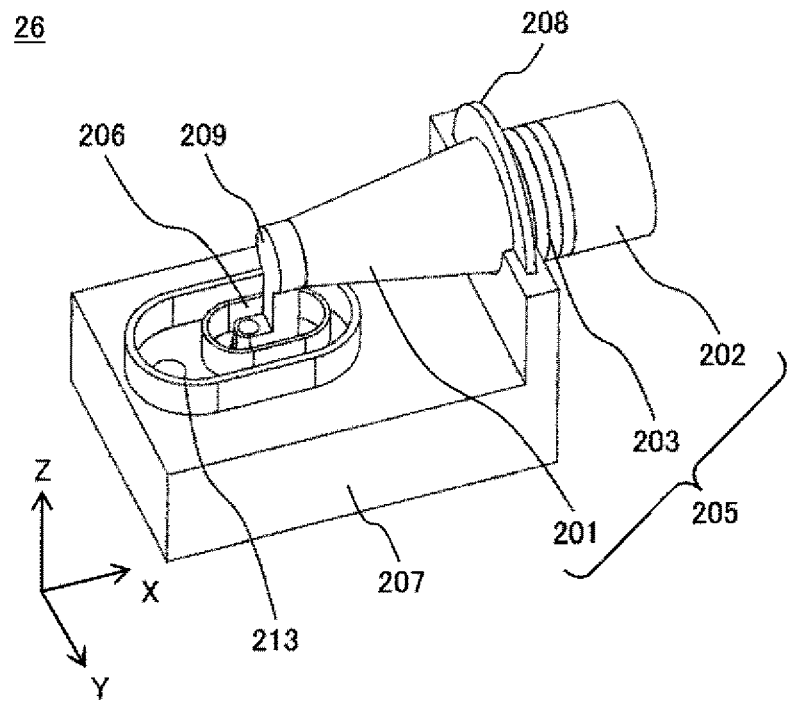
FIG. 2A is a perspective view of an ultrasonic cleaner.
Figure 2B:
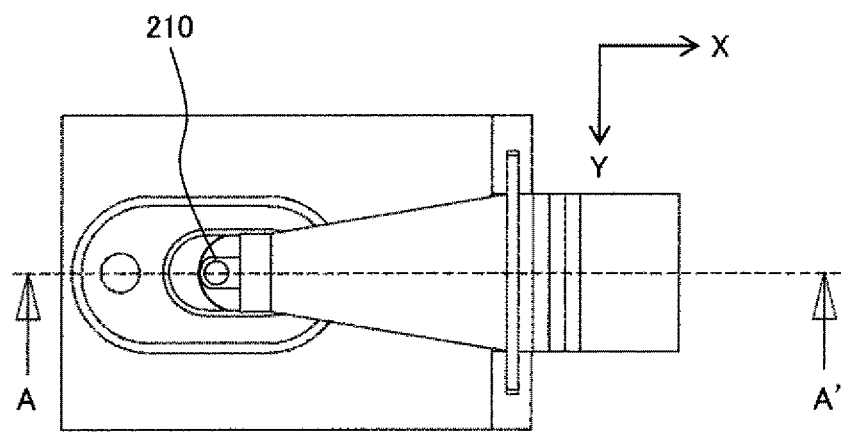
FIG. 2B is a top view of the ultrasonic cleaner.
Figure 2C:
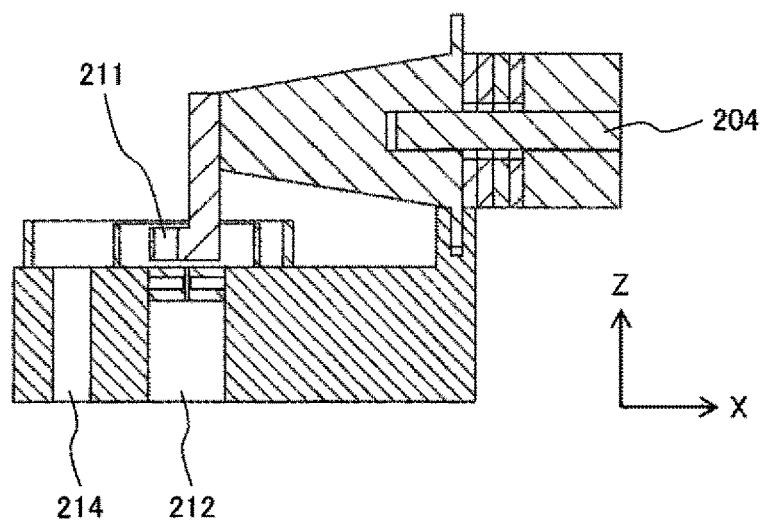
FIG. 2C is a cross-sectional view of the ultrasonic cleaner taken along a line A-A'.
Figure 2D:
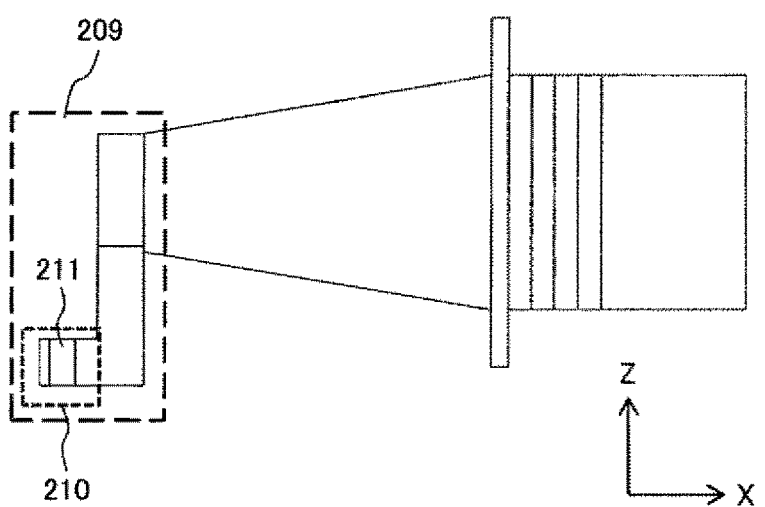
FIG. 2D is a side view of an ultrasonic transducer and a vibration head.

An exemplary configuration of the ultrasonic cleaner 26 will be described using FIGS. 2A to 2D. FIG. 2A is a perspective view of the ultrasonic cleaner 26, FIG. 2B is a top view, FIG. 2C is a cross-sectional view taken along A-A' (FIG. 2B), and FIG. 2D is a side view of the ultrasonic transducer and a vibration head.

The ultrasonic cleaner 26 includes one or more piezoelectric elements 203 interposed between a front mass 201 and a back mass 202, the ultrasonic transducer (a bolt tightening Langevin transducer (BLT: Bolt-clamped Langevin Type Transducer)) 205 which is configured by connecting the front mass 201 and the back mass 202 with a bolt 204, a vibration head 209, and a base portion 207 which includes a cleaning tank 206 to store the cleaning solution. Herein, the axial direction of the bolt 204 of the ultrasonic transducer 205 is defined as an X direction, a direction perpendicular to the X direction in the top surface (horizontal plane) of the base portion 207 is defined as a Y direction, and a direction perpendicular to the horizontal plane (that is, the vertical direction) is defined as a Z direction.

The ultrasonic transducer 205 includes a flange portion 208, and fixed to the base portion 207. While the lower side of the flange portion 208 is fixed to the base portion 207 in the drawing, it is desirable that a member to fix the flange even to the upper side of the flange portion 208 is provided, and the member and the base portion 207 is connected so as to evenly fix the entire periphery of the flange portion 208. In addition, a rubber may be inserted to a portion where the flange portion 208 and the base portion 207 abut in order to prevent friction and noises between the flange portion 208 and the base portion 207.

The vibration head 209 extending toward the cleaning tank 206 is provided at the tip end on a side near the front mass of the ultrasonic transducer 205. The tip portion 210 of the vibration head 209 is a cylindrical shape, and is adjusted to come to a position to be soaked in the cleaning solution which is contained in the cleaning tank 206 at a position not to abut on the cleaning tank 206. In the cylindrical vibration head tip portion 210, a cylindrical hole 211 is provided which is larger than the outer diameter of the tip end of the nozzle 22. Further, the front mass 201 and the vibration head 209 may be manufactured separately and fixed with bolts, or may be manufactured integrally. In addition, a pipe 212 is provided in the cleaning tank 206 to supply the cleaning solution, and supplies a constant amount of cleaning solution, so that the cleaning solution in the cleaning tank 206 overflows and is replaced. In other words, the cleaning solution supplied from the cleaning liquid supply pipe 212 overflows from the upper end of the side wall of the cleaning tank 206, flows to a liquid receiver 213 in the outer periphery of the cleaning tank 206, and is discharged from a drainage 214, so that the height (liquid level) of the cleaning solution in the cleaning tank 206 becomes constant whenever the cleaning solution is supplied.

In order not to lower the throughput of the device, the replacement of the cleaning solution is necessarily performed in a short time. However, if a supply speed of the cleaning solution is fast, the cleaning solution is sprayed, and may be scattered to the surroundings of the ultrasonic cleaner 26. If the cleaning liquid supply pipe 212 is located in the lower portion of the vibration head tip portion 210, the supplied cleaning solution reaches the vibration head tip portion 210, and the flowing speed into the cleaning tank 206 is suppressed so as to prevent the scattering of the liquid even in a case where the supply speed of the cleaning solution is fast. On the contrary, in a case where the cleaning solution is supplied from the upper portion of the cleaning tank 206 (that is, an upper side from the liquid level), the air is mixed, and the cleaning solution is bubbled. Therefore, it is desirably that the liquid is supplied in the cleaning tank 206. In addition, if the pipe 212 is provided in the side wall of the cleaning tank 206, and the cleaning solution is supplied to be fitted to the vibration head tip portion 210, the same effect as when being located on the lower portion is obtained. On the other hand, the cleaning solution is pushed up from the vibration head tip portion 210 toward the front mass 201. Thus, there is a concern that the component of the cleaning solution stays in the connection portion between the front mass 201 and the vibration head 209, and causes contamination. Therefore, when being supplied, the cleaning solution is desirably supplied from the lower portion of the vibration head tip portion 210 as illustrated in FIG. 2. However, if the liquid does not have a problem of attaching or scattering like water instead of the cleaning solution, there is no problem in supplying the liquid from the upper side or the side wall of the cleaning tank 206. In particular, in a case where the vibration head 209 is cleaned for maintenance, a pipe separately from the cleaning liquid supply pipe 212 is provided in the side surface to effectively supply the water. Such a configuration will be described below using FIG. 9.

Further, the liquid receiver 213 is illustrated to be provided to abut on the entire periphery of the cleaning tank 206 in the drawing. However, since the cleaning solution to be contained in the cleaning tank 206 can be made small in this embodiment, the replacement of the cleaning solution can be performed in a short time as that much. Therefore, a cut-out portion is provided in part of the side wall of the cleaning tank 206 to make the cleaning solution flow out only from the lowered side wall, and the liquid receiver 213 is shaped to abut on the side wall portion where the cut-out portion instead of the entire periphery of the cleaning tank 206, so that the size can be reduced. With this configuration, the base portion 207 of the ultrasonic cleaner 26 can be effectively reduced.

While not illustrated in the drawing, electrodes (for example, copper plates) are interposed between metal blocks (201 and 202) and the piezoelectric element 203 and between the plurality of piezoelectric elements 203. When a sinusoidal voltage of a predetermined frequency is applied to these electrodes, the ultrasonic transducer 205 is driven in the axial direction of the bolt 204. In particular, it is known that the amplitude generated by the piezoelectric element 203 can be amplified by forming the front mass 201 in a horn shape (a shape changing the diameter on a side near the piezoelectric element 203 and that on a side near the vibration head). If the length and the shape of the horn are designed according to a desired frequency, a large amplitude is obtained with small power. In the drawing, while a conical horn shape is illustrated, other shapes (exponential horn, etc.) may also be applied.

Further, the vibration head 209 is provided to be elongated at the tip end of the front mass 201 of the horn shape, and is resonated in synchronization with the vibration of the ultrasonic transducer 205, so that a large displacement can be generated in the vibration head tip portion 210. With this configuration, the electric energy applied to the ultrasonic transducer 205 can be efficiently converted to the vibration (kinetic energy) of the vibration head tip portion 210.

When the nozzle 22 is cleaned by the ultrasonic cleaner 26, the piezoelectric element 203 is driven at a predetermined frequency, the nozzle 22 is inserted to the cylindrical hole 211 of the vibration head tip portion 210 in a cleaning range (a range of about 5 mm from the tip end of the nozzle 22) and immersed in the cleaning solution for a certain time, so that contamination attached to the outer periphery of the nozzle 22 is removed by cavitation. After cleaning, the nozzle 22 is pulled out of the ultrasonic cleaner 26, the cleaning solution of the cleaning tank 206 is replaced due to the overflowing. Therefore, when the nozzle 22 is cleaned next, the cleaning can be performed with the new cleaning solution, and carry-over can be suppressed. These suppressions are performed in accordance with a predetermined sequence of the device by the control unit 28.

In this way, when there are the cylindrical hole 211 of the vibration head tip portion 210 and the cleaning solution, the cleaning can be made. Therefore, it is possible to reduce the amount of cleaning solution to be used. For example, if the outer diameter of the nozzle is equal to or less than 1.0 mm, the cleaning can be made even by an among of 0.5 mL or less of the cleaning solution, and the size of the cleaner can be minimized. Further, even if water is supplied and used as the cleaning solution for the cleaning tank 206, a high cleaning effect of the cavitation is obtained. Therefore, the water may be used depending on a target cleaning effect.

The ultrasonic cleaner 26 drives the piezoelectric element 203 at a frequency of 20 to 100 kHz which is suitable to generate the cavitation in the cleaning solution, makes the vibration head 209 resonate in the cleaning tank 206, and generates ultrasonic vibrations by the vibration (the frequency is the same as the driving frequency) of a large displacement. With this configuration, the cavitation is generated in a range of the vibration head 209 and, in particular, around an antinode (a portion where the amplitude is maximized). The vibration head tip portion 210 (open end) becomes the antinode. Therefore, the nozzle 22 and the tip end are intensively cleaned by the cavitation generated in the cylindrical hole 211.

Figure 3A:
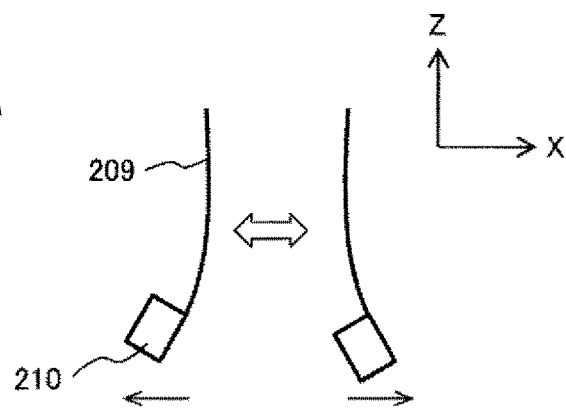
FIG. 3A is a diagram illustrating a modification of a vibration head in a primary vibration mode.
Figure 3B:
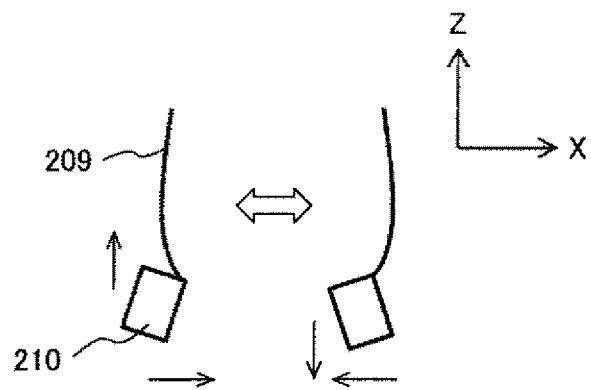
FIG. 3B is a diagram illustrating a modification of a vibration head in a secondary vibration mode.

The vibration of the vibration head 209 will be described using FIGS. 3A to 3C. The vibration head 209 has a plurality of vibration modes according to the way of deformation accompanying the resonant vibration. FIG. 3A illustrates a deformation of a primary vibration mode of the vibration head 209, FIG. 3B illustrates a deformation of a secondary vibration mode of the vibration head 209, and FIG. 3C illustrates an impedance waveform of the ultrasonic transducer to which the vibration head is attached.

There are a plurality of resonance frequencies of the vibration head 209, and different deformations are generated at the time of resonance. FIG. 3A illustrates the primary vibration mode which is a vibration mode where the vibration head tip portion 210 vibrates in the X direction. FIG. 3B illustrates the secondary vibration mode which is a vibration mode where the vibration head tip portion 210 vibrates in the X direction, and a node (a portion where the vibration is minimized) in the middle of the vibration head tip portion 210 is formed, and the vibrations occurs in the vertical direction (the Z direction). Further, in the drawing, the deformation is exaggerated in order to help with understanding on the difference of the vibration modes.

Figure 3C:
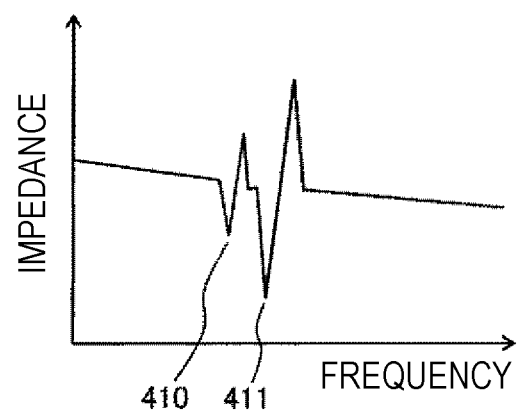
FIG. 3C is an impedance waveform of an ultrasonic transducer having a vibration head attached thereto.

FIG. 3C is a diagram in which the horizontal axis represents frequency and the vertical axis represents impedance. A resonance point 410 of the vibration head 209 and a resonance point 411 of the ultrasonic transducer 205 (a mode where the ultrasonic transducer 205 is stretchable in the axial direction of the bolt 204) are illustrated. The resonance point 410 may be either the resonance point of the primary vibration mode or the resonance point of the secondary vibration mode, and is a vibration mode to be used in cleaning. The resonance frequency necessarily falls within a range of 20 to 100 kHz where the cavitation easily occurs. Further, the vibration head 209 and the ultrasonic transducer 205 is desirably designed such that the resonance point 410 and the resonance point 411 approaches, and an absolute value of the difference therebetween is equal to or less than 10 kHz. This is because the electric energy can be converted into the vibration of the vibration head tip portion 210 with efficiency by the interaction while the resonance points approach.

Figure 4:
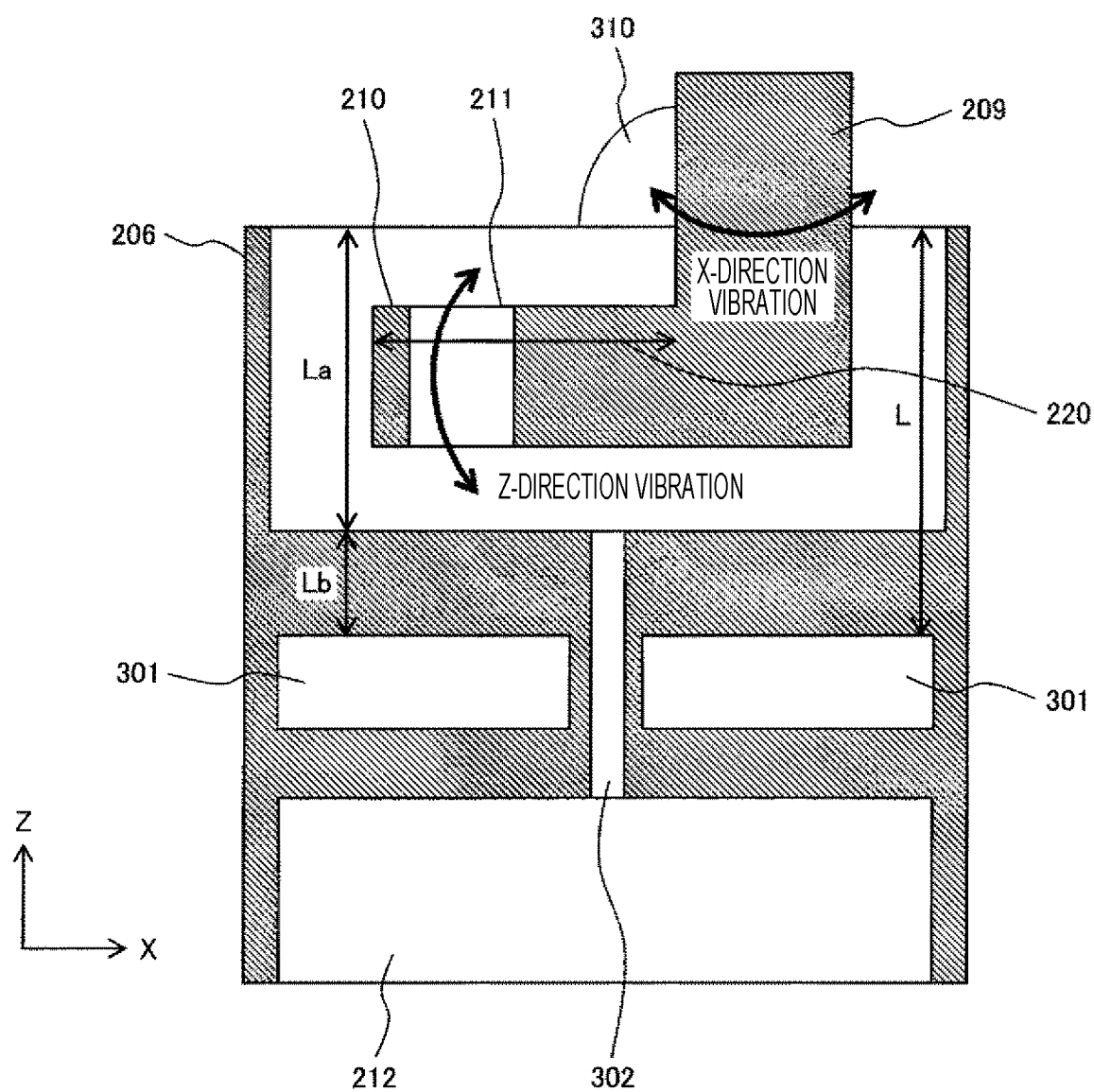
FIG. 4 is a schematic cross-sectional view of a cleaning tank and a vibration head of an ultrasonic cleaner.

FIG. 4 is a schematic cross-sectional diagram of the vibration head 209 and the cleaning tank 206 of the ultrasonic cleaner of this embodiment. The vibration head 209 vibrates at the resonance point of the secondary vibration mode, and vibrates in both the X and Z directions. As described above, the vibration head tip portion 210 is positioned in the cleaning solution in the cleaning tank 206, and the nozzle 22 is inserted in the cylindrical hole 211. The nozzle 22 is cleaned. With this configuration, the nozzle 22 is cleaned by the cavitation which occurs near the inner wall of the cylindrical hole 211. Herein, if the vibration head 209 supersonically vibrates, a liquid raiser 310 is generated around the vibration head 209, and a high water level is partially caused by the depth of the cleaning tank 206. Therefore, if the position of the cylindrical hole 211 is located near the neck (a portion in the vibration head 209 extending in the Z direction between the front mass 201 and the vibration head tip portion 210) of the vibration head 209, the range where the nozzle 22 is immersed into the cleaning solution is widened before cleaning, and is wet up to 7 mm with respect to the set range 5 mm for example. In a case where a cleaning solution other than the water is used, the cleaning portion of the nozzle 22 is necessarily cleaned with water to remove the cleaning solution. However, the cleaning range is necessarily widened in this water cleaning process. If the cleaning range is widened, the throughput is lowered, the water is easily left in the nozzle 22, and the sample is thinned. Therefore, a head tip length 220 is desirable made long to make the position of the cylindrical hole 211 separated from the neck of the vibration head 209 such that the nozzle 22 does not come into contact with the liquid raiser 310.

Further, in this embodiment, the cleaning tank 206 is made of a material (for example, resin) through which the ultrasonic wave generated in the cleaning solution can be transparent, and is fixed to the base portion 207 through an air tank 301 to store the air below the cleaning tank 206. The cleaning tank 206 may be made of resin entirely or partially. At least the area where the vibration head tip portion 210 is projected in the vertical direction is made of resin among the bottom portion of the cleaning tank 206. Similarly, the air tank 301 is also designed to cover the area where at least the vibration head tip portion 210 is projected in the vertical direction. However, as described above, the cleaning solution is desirably supplied from the lower portion of the cleaning tank 206. Therefore, a pipe 302 to supply the cleaning solution and the cleaning liquid supply pipe 212 are provided in the bottom portion of the cleaning tank 206 in FIG. 4. Therefore, the resin of the bottom of the cleaning tank 206 and the air tank 301 are disposed to surround the periphery of the pipe 302. In other words, the cleaner which does not supply the cleaning solution from the bottom surface of the cleaning tank 206 is not necessary to make a hole in the lower portion of the cleaning tank 206. In addition, in a case where the entire cleaning tank 206 is made of resin, the cleaning tank may be manufactured by being molded integrally with the base portion 207. Therefore, the manufacturing cost can be lowered.

The height of the cleaning solution stored in the cleaning tank 206 is defined as La. Since the cleaning solution is supplied to the cleaning tank 206 to overflow, the liquid is stored up to the upper end of the side wall of the cleaning tank 206. Therefore, the height La of the cleaning solution stored in the cleaning tank becomes high up to the upper end of the side wall (partially or entirely) of the cleaning tank abutting on the liquid receiver from the bottom surface of the cleaning tank. In addition, if the thickness of the bottom portion of the cleaning tank 206 made of a material through which the ultrasonic wave generated by the cleaning tank 206 can be transparent is defined as Lb, the length L from the liquid level to the air tank 301 is La+Lb.

The ultrasonic wave is generated in the cleaning solution by the vibration of the vibration head tip portion 210. With the air tank 301, the ultrasonic wave generated by the vibration in the Z direction progresses in the Z direction. When L satisfies a predetermined condition, the ultrasonic wave reflects on the liquid level and an air layer of the air tank 301, and thus a standing wave is generated in the Z direction in the cleaning tank 206. Comparing the vibration amplitudes of the vibration head 209 in a resin cleaning tank A of the structure illustrated in FIG. 4 generating the standing wave in the Z direction and a resin cleaning tank B having no air tank 301, the vibration amplitude of the vibration head 209 in the cleaning tank A becomes large. In addition, the result of comparing the cleaning effects using the vibration head 209 of the same shape in the cleaning tank A and the cleaning tank B also shows that the cleaning effect of the cleaning tank A is high.

This result can be attributed to the following reasons. The cleaning solution has a viscosity. The cleaning solution serves as a vibration load with respect to the vibration of the vibration head. In a case where the nozzle 22 is cleaned by the cavitation generated near the inner wall of the cylindrical hole 211 as described in this embodiment, the vibration in the X direction mainly contributes to the generation of the cavitation. However, in the secondary vibration mode, the vibration head 209 resonates in a state where not only the vibration in the X direction but also the vibration in the Z direction are generated. Herein, if the vibration in the Z direction is suppressed by the cleaning solution, the vibration in the X direction is also suppressed. When the standing wave is generated in the Z direction in the cleaning tank 206, the vibration load is relieved the vibration in the Z direction of the vibration head tip portion 210, the vibration in the Z direction becomes large, and the vibration in the X direction is also amplified more than a case where the standing wave is not generated.

Figure 5:
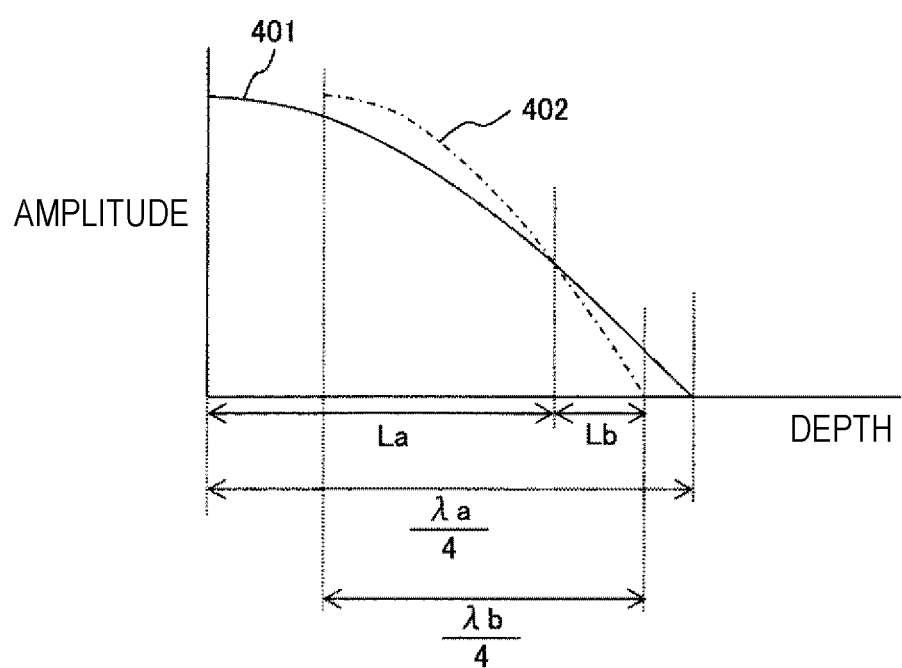
FIG. 5 is a diagram illustrating a standing wave generation condition.

A generation condition of the standing wave will be described using FIG. 5. The vertical axis of FIG. 5 represents an amplitude of a wave, and the horizontal axis represents a depth from the liquid level. In addition, a waveform 401 is a waveform in the case of advancing in liquid, and a waveform 402 is a waveform in the case of advancing in resin. The generation condition of the standing wave is $L=(\lambda/4) \times n$ ($\lambda$: One wavelength of the ultrasonic wave, n: integer). In addition, the wavelength of the ultrasonic wave differs depending on a medium through which the ultrasonic wave advances. The wavelength in liquid is $\lambda a$, and the wavelength in resin (between the bottom surface of the cleaning tank 206 and the air tank 301) is $\lambda b$. Further, the wavelengths in liquid and resin becomes values obtained by dividing the sound velocity (about 1500 m/s in water, 2000 m/s in resin while depending on types) determined according to a medium by a driving frequency.

In order to generate the standing wave (n=1), the length Lb may be set such that the wave advances up to the depth La by the waveform 401, and advances up to L (=La+Lb) from the depth La by the waveform 402. In other words, if the wave advances by a rate a of the ¼ wavelength of the ultrasonic wave up to the depth La, the depths are expressed as follows.

$$La = \alpha \times (\lambda a/4)$$

$$Lb = (1-\alpha) \times (\lambda b/4)$$

Therefore, a minimum distance of Lb is obtained by $Lb=(1-La/(\lambda a/4)) \times (\lambda b/4)$. Since L=La+Lb is satisfied, the condition of generating the standing wave can be adjusted by the distance Lb from the bottom surface of the cleaning tank 206 up to the air tank 301. Therefore, the liquid amount can be reduced as much as the height of Lb compared to a case where the bottom portion of the cleaning tank vibrates to adjust the liquid level so as to generate the standing wave. In other words, the nozzle 22 can be strongly cleaned with a small amount of liquid. The value A is changed depending on a temperature change, and may be deviated from $L=(\lambda/4) \times n$ as a design value. However, a high cleaning effect is obtained as long as a condition close a standing wave generation condition.

Further, the resin may contain resin as a main component. For example, a material other than resin such as a glass fiber for reinforcing the structure may be mixed. In addition, the air layer of the air tank 301 has been described as a reflector of the ultrasonic wave. However, the similar effect can be obtained by burying metal (for example, iron or stainless material) reflecting the ultrasonic wave in the position of the air tank 301. In other words, the reflectance of the material of the bottom portion of the cleaning tank 206 is necessarily lower than that of the reflector such as air or metal. Further, in order to suppress loss, the reflectance of the material of the bottom portion of the cleaning tank 206 is suitable as small as possible, and the reflectance of the reflector is suitable as high as possible.

The reflectance to a medium different from the liquid (water) is as follows.

$$\text{Reflectance } r = (X-Y)^2/(X+Y)^2$$

Herein, X represents acoustic impedance of the water, and Y represents acoustic impedance of a medium (for example, resin and metal). In addition, the acoustic impedance is a product of the density of the medium and the sound velocity. In other words, the reflectance is increased in a boundary as the difference in the acoustic impedance is increased. Therefore, the acoustic impedance ratio between materials to be used can be used as an index of the material. The acoustic impedance X of the water is about $1.5 \times 10^6$ kg/m² s. The acoustic impedance of the resin differs according to a composition, and is about $3 \times 10^6$ kg/m² s. The order is the same as the acoustic impedance of the water, and the resin is a easily used material. As the reflector, a gas (about 430 kg/m) such as air of which the acoustic impedance is extremely small is particularly suitable. However, the acoustic impedance (about $4 \times 10^7$ kg/m) is larger than the acoustic impedance of the resin by 10 times or more even using a metallic material, and can be used.

In addition, the sound velocity can be similarly used as a simple index. In this case, while the sound velocity in water is about 1500 m/s, the sound velocity in resin is 2000 to 3000 m/s (about two times or less). With this regard, the sound velocity in air is about 330 m/s, and the sound velocity in metal is 5000 m/s or more. For example, metal in which the sound velocity is two times or more the sound velocity of resin may be selected.

Further, an example of reducing the load of the vibration in the Z direction is illustrated in FIG. 4. However, the load of the vibration in the X direction can be reduced. In other words, in a case where the vibration head 209 is operated in the primary vibration mode, the vibration head 209 vibrates only in the X direction. In such a case, the vibration in the X direction can be amplified by designing the cleaning tank such that the standing wave is generated in the X direction. In this case, the air tank 301 of FIG. 4 is unnecessary, and the function as the reflector performed by the air tank 301 is performed by the air layer on the outside (that is, the liquid receiver 213) of the side wall of the cleaning tank. In addition, a length La' of the cleaning solution in this case is from the end surface of the vibration head 209 to the side surface (a side near the cleaning water) of the cleaning tank 206, and a thickness of the side wall of the cleaning tank 206 is Lb'.

$$L'=La'+Lb'=(\lambda/4)\times n \ (\lambda: \text{One wavelength of the ultrasonic wave}, n: \text{integer})$$

The vibration load of the vibration in the X direction is reduced, and the vibration in the X direction can be amplified.

In this way, the air layer or the metallic member is provided at a distance of an integer multiple of the ¼ wavelength which is obtained from the sound velocity and the frequency driving the ultrasonic transducer from the area which is the antinode of the ultrasonic wave generated when the vibration head resonantly vibrates through the cleaning tank portion made of a material (containing resin as a main component) with respect to a deformation direction of the vibration head when the vibration head in this embodiment vibrates resonantly. Therefore, the vibration load in the direction is relieved, and a high cleaning effect is obtained.

In this embodiment, it is suitable that the diameter of the tip end of the target nozzle 22 is 0.5 to 1.5 mm thin, and the diameter of the cylindrical hole 211 is 2 to 4 mm. If the cleaning range is 4 mm of the tip end of the nozzle 22, the height (the liquid level La) of the inner side of the cleaning tank 206 is about 6 mm. In a case where 50 kHz is used for driving, the thickness Lb from the bottom surface of the cleaning tank 206 to the air tank 301 becomes about 2 mm. As described above, since the generation condition of the standing wave is L=(λ/4)×n, the length of Lb to generate the standing wave having a length longer than 2 mm can be taken if n is set to high. However, if the propagation distance of the ultrasonic wave in the cleaning tank 206 becomes long, loss due to heat generated when the ultrasonic wave propagates in the material of the bottom portion of the cleaning tank 206 easily occurs. Therefore, the intensity of the reflected ultrasonic wave is weakened. Therefore, Lb is desirably set to be short. In other words, n=1 is desirable.

Figure 6:
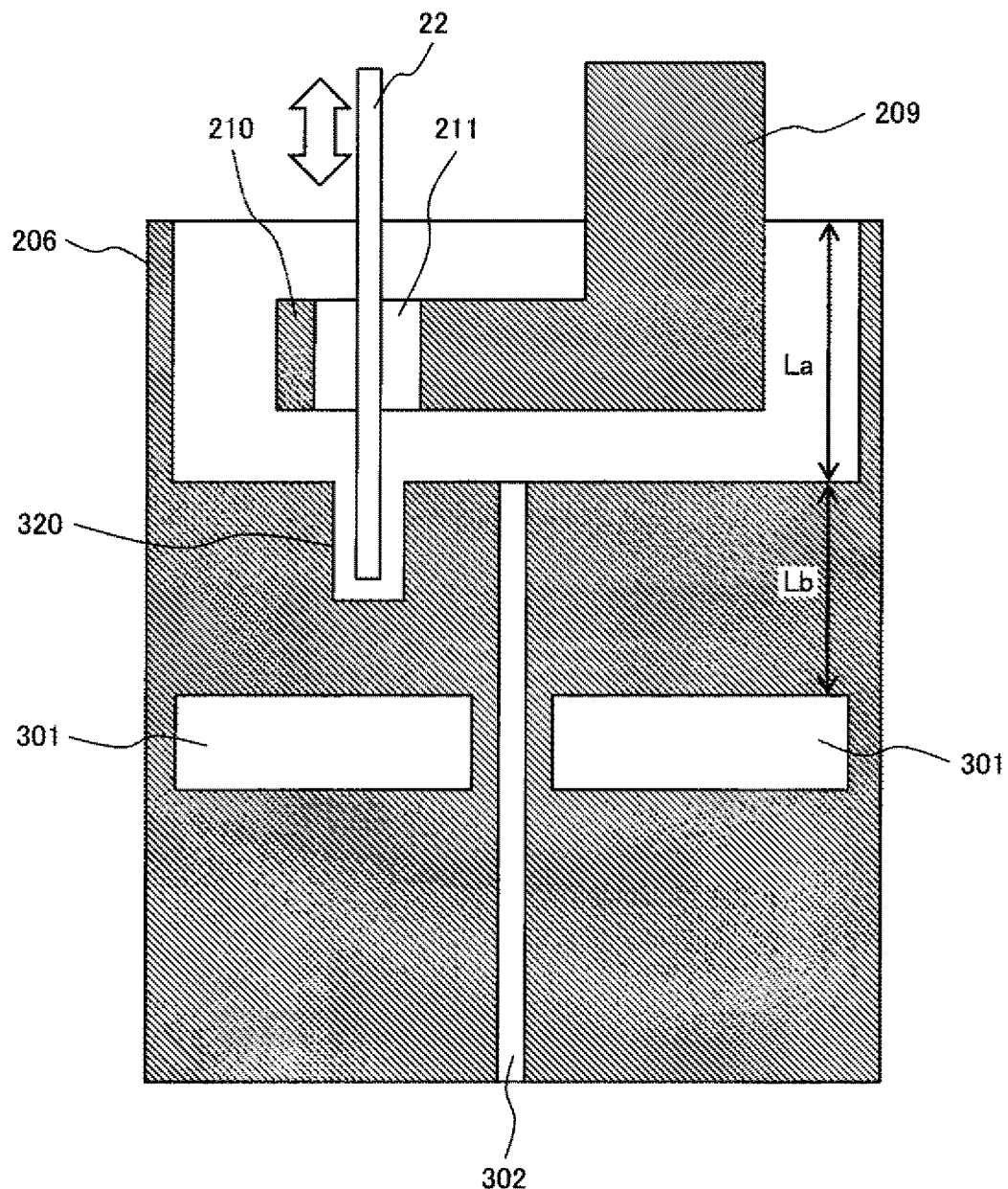
FIG. 6 is an example in which a hole is provided at a bottom of a cleaning tank.

FIG. 6 illustrates an example in which a hole is provided in the cleaning tank of the ultrasonic cleaner of this embodiment. The ultrasonic cleaner 26 mounted in the automatic analyzer 10 is required to replace the cleaning solution whenever the nozzle 22 is cleaned. Therefore, it is desirable that the cleaning solution is used less for cleaning in order to suppress a consumption amount of cleaning solution. A hole 320 is provided in the bottom of the cleaning tank 206, and the nozzle 22 is enabled to move up and down in the hole 320, so that a target nozzle cleaning range can be cleaned even in a small liquid level.

For example, in order to suppress the amount of cleaning solution, in a case where the height of the vibration head tip portion 210 is short, or in a case where the liquid level La of the cleaning tank 206 is more lowered, or in a case where the cleaning range of the nozzle 22 is intently widened regardless of the change of the liquid amount, the hole 320 may be provided. In this embodiment, the vibration head tip portion 210 amplifies the vibration caused by the standing wave in the cleaning tank 206. However, there is little propagation of the ultrasonic wave immediately below the cylindrical hole 211 of the vibration head tip portion 210. Therefore, even in a case where the hole 320 is provided immediately below the cylindrical hole 211, the vibration amplification effect of the vibration head 209 by the standing wave is obtained similarly to the configuration of FIG. 4. In order to clean the nozzle 22, a diameter of 2 to 4 mm almost similar to that of the cylindrical hole 211 may be suitable, and the depth depends on the cleaning range of the nozzle. For example, in a case where the cleaning range is increased by 2 to 3 mm, a depth of 3 to 4 mm may be suitable.

When the cleaning is performed by the cleaning tank 206 with the hole 320 at the bottom according to the sequence of the control unit 28, the sample dispensing mechanism 15 inserts the nozzle 22 in the cylindrical hole 211 of the vibration head tip portion 210, and drives the ultrasonic transducer 205 (the nozzle 22 may be inserted after driving the ultrasonic transducer 205). Then, the nozzle 22 is moved up and down to fall within the cleaning range of the nozzle 22 in the cylindrical hole 211. With the movement of the nozzle 22, a wide range of cleaning can be made with a small amount of liquid. The control unit determines an order such that the tip end of the nozzle 22 is cleaned first or the root is cleaned first. In addition, for example, if it is known that dirt is easily accumulated at the tip end of the nozzle 22, it is possible to adjust the cleaning time of the tip end of the nozzle 22 to be extended, and the cleaning time of the root to be short.

Figure 7A:
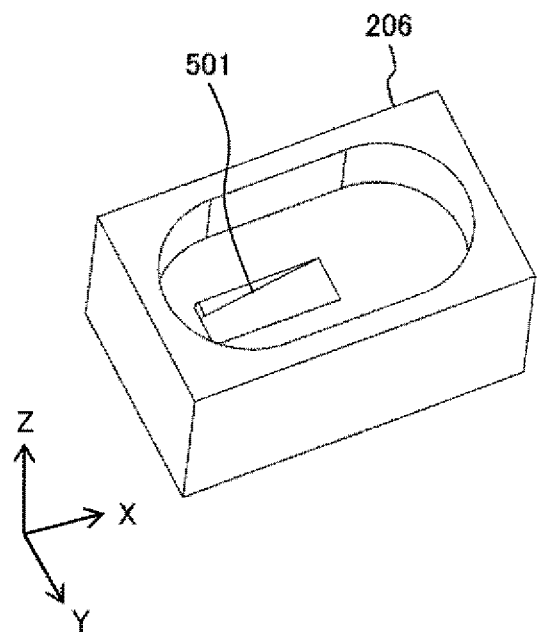
FIG. 7A is a perspective view of a cleaning tank in which a slant hole is provided at a bottom portion.
Figure 7B:
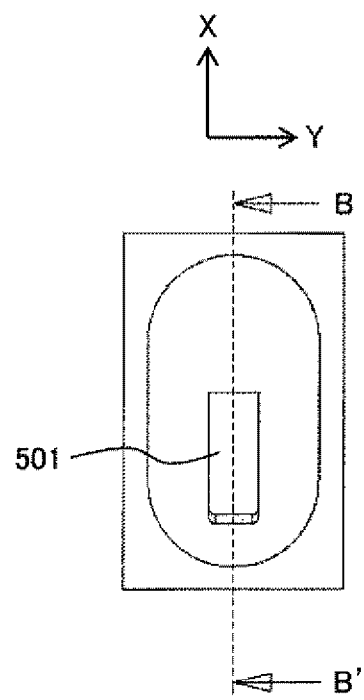
FIG. 7B is a top view of a cleaning tank in which a slant hole is provided at a bottom portion.
Figure 7C:
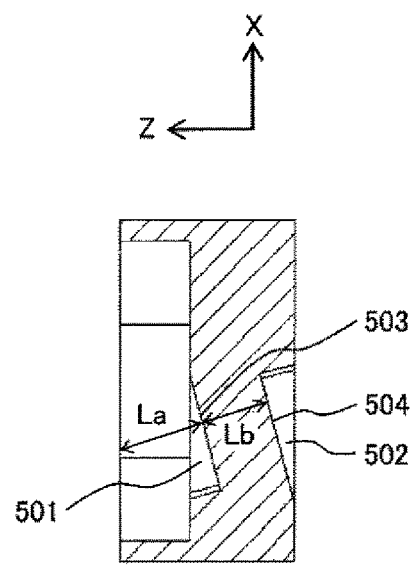
FIG. 7C is a cross-sectional view taken along a line B-B' of a cleaning tank in which a slant hole is provided at a bottom portion.

FIGS. 7A to 7C are examples where a slant hole is provided in the bottom portion of the cleaning tank 206. FIG. 7A is a perspective view of the cleaning tank 206, FIG. 7B is a top view, and FIG. 7C is a cross-sectional view taken along B-B' (FIG. 7B). Similarly to the embodiment of FIG. 6, in order to reduce the cleaning solution, a slant hole 501 of which the bottom surface is inclined with respect to the bottom surface of the cleaning tank is provided in part of the bottom portion. Further, a slant hole 502 of the same inclination angle as the slant hole 501 is provided even in the rear surface of the cleaning tank 206 (that is, a bottom surface 503 and a top surface 504 are parallel). The ultrasonic wave generated by the vibration in the Z direction of the vibration head tip portion 210 passes through the cleaning tank 206, and is reflected on the air layer in the slant hole 502 of the rear surface of the cleaning tank. At this time, the reflection angle of the ultrasonic wave is determined by the inclination angle of the bottom surface 503 of the slant hole 501. Therefore, the ultrasonic wave can be reflected on the cylindrical hole 211 of the vibration head tip portion 210 which is on the upper side of the slant hole 501 by adjusting the inclination angle. With this configuration, the ultrasonic wave generated by the vibration in the Z direction is also introduced to the cylindrical hole 211 of the vibration head tip portion 210 in addition to the ultrasonic wave generated by the vibration in the X direction, so that the intensity of the ultrasonic wave in the cylindrical hole 211 is increased, and the cavitation is intensively generated. Therefore, a high cleaning effect can be obtained. For example, in a case where the liquid level is 6 mm, and the driving frequency is 50 kHz, the ultrasonic wave is effectively reflected on the vibration head tip portion 210 with a plate thickness of 3 mm and an inclination angle of 15 degrees.

In this case, in a case where the length of the cleaning solution along the axis perpendicular to the bottom surface 503 of the slant hole 501 is La", and the distance between the slant hole 501 and the slant hole 502 is Lb", the following relation is established.

$$L''=La''+Lb''=(\lambda/4)\times n \text{ ($\lambda$: One wavelength of the ultrasonic wave, $n$: integer)}$$

Technically, the bottom surface 503 of the slant hole 501 and the water surface are not parallel. Therefore, the length La" technically differs depending on a measurement position, but such a difference can be ignored. In addition, a pipe to supply the cleaning solution is provided in a portion other than the slant hole 501 and the slant hole 502. In addition, even if the lower portion of the slant hole 502 is further covered by metal or resin, the ultrasonic wave is reflected on the air of the slant hole 502. Therefore, the reflection function of the ultrasonic wave is not damaged. Further, even if the metallic member is buried at the same position as the top surface 504 of the slant hole 502 instead of the slant hole 502, the same similar effect can be obtained.

Figure 8:
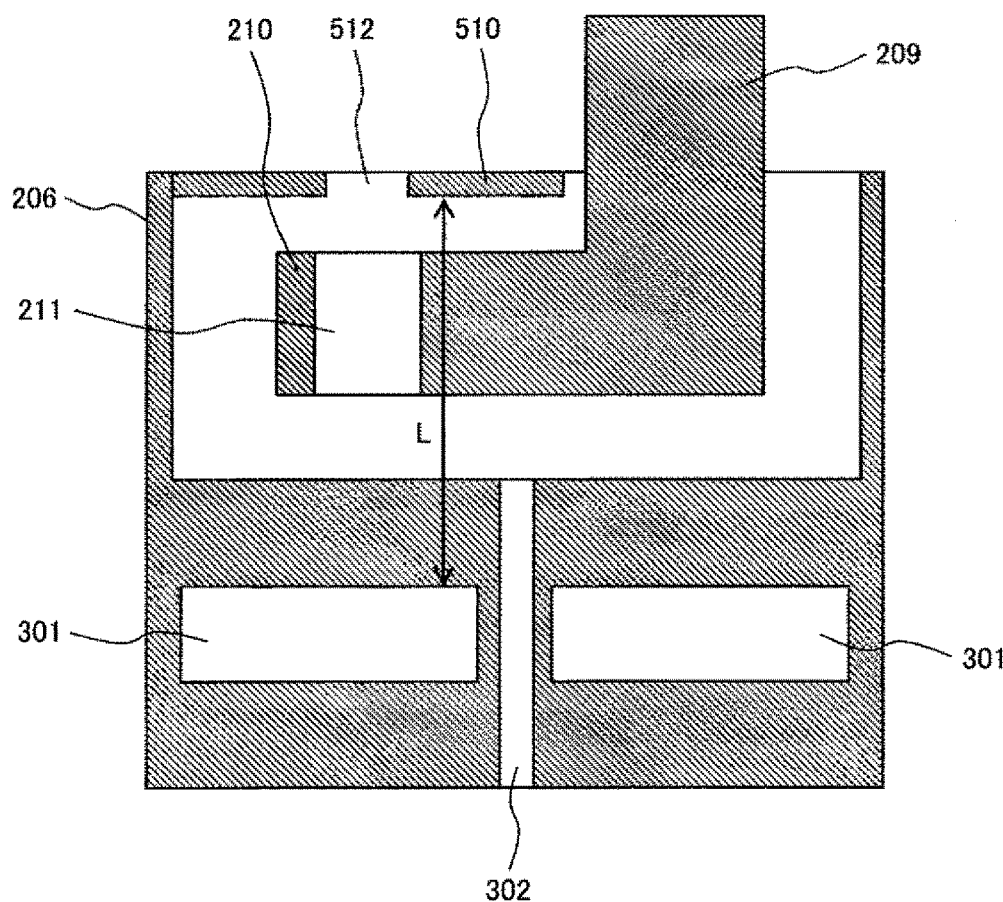
FIG. 8 is an example in which a cover is provided at a top surface of a cleaning tank.

FIG. 8 illustrates an example where a cover is added to the top surface of the cleaning tank 206. When the ultrasonic transducer 205 is driven, the cleaning solution is likely to be scattered from the vibration head 209 and the vibration head tip portion 210 depending on the liquid state. Therefore, it is desirable to provide a cover 510 in the top surface of the cleaning tank 206. In a case where the cover 510 is provided at a position in contact with the cleaning solution in the cleaning tank 206, the condition of generating the standing wave is necessarily set such that the distance from the surface in the cleaning tank 206 of the cover 510 to the air tank 301 becomes L, and L is set to be $\lambda/4$ when the cover 510 is made of metal. With the cover 510 provided in the liquid level, the standing wave can be generated in the cleaning solution in the cleaning tank 206 without any influence of a fluctuation of the liquid level caused by the vibration of the vibration head 209 and a change of the liquid level caused by the liquid raiser.

The cover 510 requires a nozzle insertion port 512 is necessary for inserting the nozzle 22. However, similarly to a case where the hole 320 is provided in the bottom of the cleaning tank 206 of FIG. 6, the upper portion of a cylindrical hole 211 in the vibration head tip portion 210 is less influenced by the reflection of the ultrasonic wave. Therefore, there is no problem even if the hole is partially provided. In addition, the hole provided to make the cleaning solution to overflow is provided at a position not overlapped with the vibration head tip portion 210, so that there is no influence of the reflection of the ultrasonic wave. Further, since the wave is reflected on the air surface, the cover 510 can also be made of resin.

Figure 9:
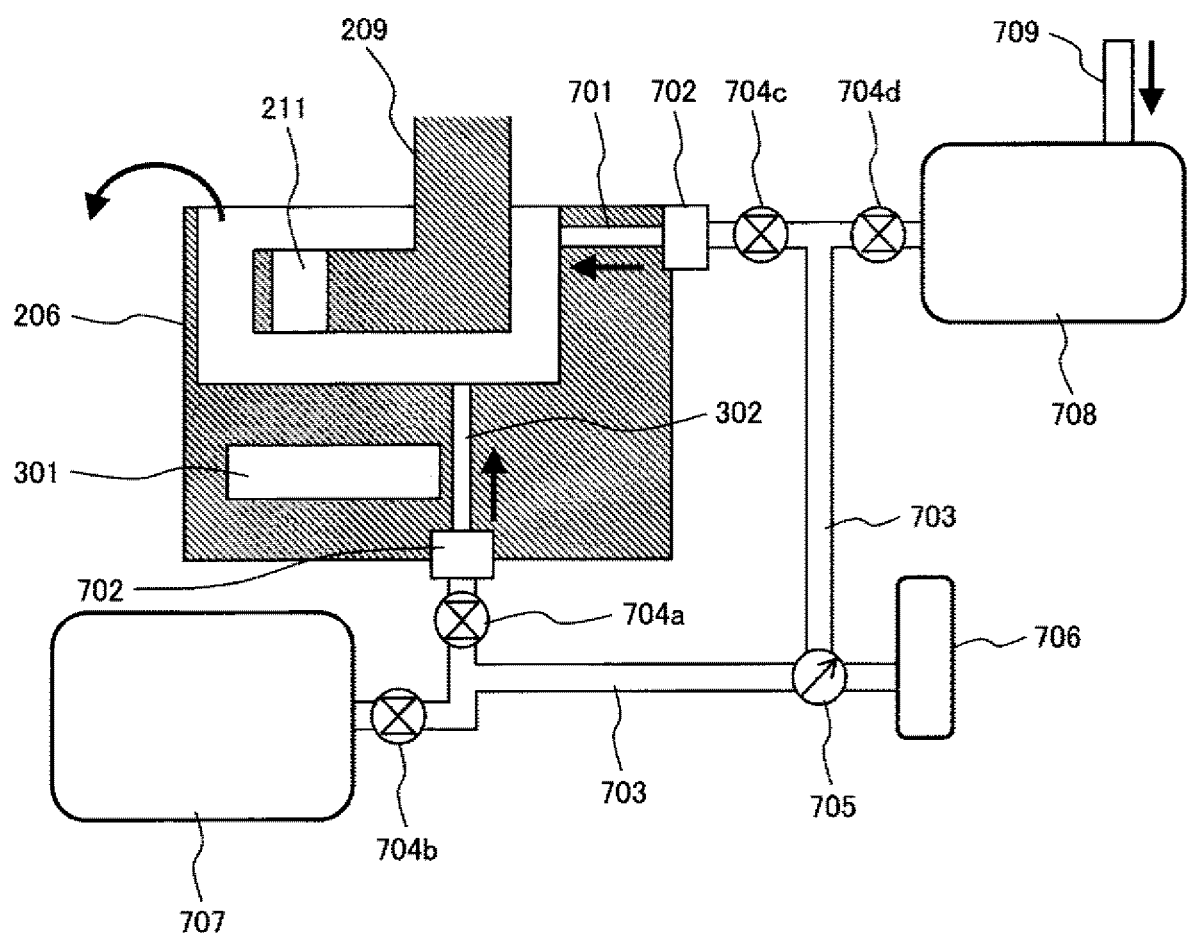
FIG. 9 is an example of a pipe configuration of an ultrasonic cleaner.

FIG. 9 illustrates an example of a pipe configuration of the ultrasonic cleaner 26. The cleaning tank 206 includes the pipe 302 supplying the cleaning solution and a pipe 701 discharging water for cleaner maintenance. These pipes each are connected to a tube 703 through a connection portion 702. The tube 703 is made of a chemical resistant material which can be used to supply the cleaning solution, and connected to a plurality of solenoid valves 704, a switching valve 705, and a syringe pump 706. The cleaning solution is stored in a cleaning solution tank 707, and is regularly refilled though different depending on using frequency of the ultrasonic cleaner 26. In addition, the water is stored in a reservoir tank 708, and is automatically refilled by being connected to a pipe 709 for the tap water.

The ultrasonic cleaner 26 configured with the above pipes replaces the cleaning solution in the cleaning tank 206 before and after cleaning the nozzle 22 according to the overflowing. Therefore, if the switching valve 705 is switched to the pipe of the cleaning solution, the cleaning solution is drawn in from the cleaning solution tank 707 in the tube 703 which sets a negative pressure to the syringe pump 706 in a state where a solenoid valve 704a is closed and a solenoid valve 704b is opened. Thereafter, the solenoid valve 704a is opened, the solenoid valve 704b is closed, and the cleaning solution in the tube 703 which sets a positive pressure to the syringe pump 706 is pressed out into the cleaning tank 206. With the operations above, a new cleaning solution is supplied into the cleaning tank 206, and the cleaning solution in the cleaning tank 206 can be replaced by overflowing. In addition, similarly to a case where the water is supplied into the cleaning tank 206, the switching valve 705 is switched to the pipe on a side of the water, and the water in the cleaning tank 206 can be supplied by the opening/closing of the solenoid valves 704c and 704d and the operation of the syringe pump 706. As described above, it is possible to supply the water and the cleaning solution into the cleaning tank 206 by the operation of one syringe pump 706.

When the automatic analyzer 10 is performing an inspection process of a sample, the nozzle 22 is repeatedly cleaned, and the cleaning solution is repeatedly replaced in a short time. Therefore, the switching valve 705 is switched to the pipe on a side of the cleaning solution. After the automatic analyzer 10 inspects the sample and before the standby state, the switching valve 705 is switched to the pipe on a side of the water, and a certain amount of water is discharged toward the vibration head 209 to wash the cleaning solution or the dirt attached to the vibration head 209. It is possible to prevent the cleaning solution from being dried up. A manual maintenance is not necessary. In addition, the cleaning solution in the cleaning tank 206 may be exchanged with water if not being used for a certain period of time (for example, holidays when the inspection is not performed). The corresponding control is also performed by the control of the device sequence process unit 612 of the control unit 28 illustrated in FIG. 1D.

According to the ultrasonic cleaner 26 described above, the standing wave caused by the reflection of the ultrasonic wave between the liquid level of the cleaning tank 206 made of a transparent material of the ultrasonic wave and the reflector such as the air tank 301 can be generated with a small liquid level. With this configuration, the vibration of the vibration head 209 can be amplified, so that the cavitation is intensively generated in the cleaning solution, and the nozzle 22 can be effectively cleaned. Therefore, it is possible to provide an inspection device and an analysis device with a high inspection accuracy without carrying over another sample attached to the nozzle 22.

In this embodiment, an example of dispensing a sample of the biochemical automatic analyzer has been described. However, the ultrasonic cleaner of the invention can similarly perform cleaning a dispensing nozzle of another clinical inspection device such as a reagent dispensing nozzle or a dispensing nozzle of an immune automatic analyzer.

REFERENCE SIGNS LIST 10 automatic analyzer
11 reagent container
12 reagent disk
13 reaction disk
14 reagent dispensing
15 sample dispensing mechanism
21 reagent nozzle
22 sample nozzle
23 sample container
24 sample rack
25 reaction cell
26 ultrasonic cleaner
27 cleaning tank
28 control unit
29 measurement unit
201 front mass
202 back mass
203 piezoelectric element
204 bolt
205 ultrasonic transducer (bolt tightening Langevin transducer)
206 cleaning tank
207 base portion
208 flange portion
209 vibration head
210 vibration head tip portion
211 cylindrical hole
212 cleaning liquid supply pipe
213 liquid receiver
214 drainage
220 vibration head tip length
301 air tank
302 liquid supply pipe
310 liquid raiser
320 hole
401 waveform
402 waveform
410 resonance point of vibration head
411 resonance point of ultrasonic transducer
501 slant hole of bottom portion of cleaning tank
502 slant hole of rear surface of cleaning tank
503 bottom surface of slant hole 501
504 top surface of slant hole 502
510 cover
512 nozzle insertion port
600 device operation/display unit
601 analysis execution operation unit
602 cleaner status display unit
611 upper-level communication process unit
612 device sequence process unit
613 sequence database
614 dispensing mechanism control unit
615 motor control unit
616 motor driving unit
617 cleaner control unit
618 ultrasonic control unit
619 ultrasonic driving unit
620 frequency adjustment unit
621 pump control unit
622 pump driving unit
701 water discharge pipe
702 connection portion
703 tube
704 solenoid valve
705 switching valve
706 syringe pump
707 cleaning solution tank
708 reservoir tank
709 clean water connection pipe

The invention claimed is:

1. An ultrasonic cleaner for cleaning a nozzle of a sample dispensing mechanism comprising:
a cleaning tank configured to store a cleaning solution;
an ultrasonic transducer configured to produce an ultrasonic wave;
a vibration head which extends from the ultrasonic transducer toward the cleaning tank and of which a tip portion is positioned in the cleaning tank and includes a cylindrical hole configured to receive the nozzle, the cylindrical hole having a longitudinal direction aligned to a vertical direction;
an air layer or a metallic member that is provided below an area formed by projecting the vibration head in the vertical direction under the cleaning tank; and
a control unit configured to drive the ultrasonic transducer at a frequency at which the vibration head is vibrated resonantly in a vibration mode accompanied by a deformation in the longitudinal direction of the cylindrical hole and a direction perpendicular to the longitudinal direction,
wherein a bottom portion of the cleaning tank located below an area formed by projecting the vibration head in the vertical direction in a bottom portion of the cleaning tank is formed of a material including resin and configured to be transparent to the ultrasonic wave, and
wherein a maximum height of the cleaning solution that can be stored in the cleaning tank is shorter than ¼ of a wavelength determined by the controller based on a sound velocity and the frequency driving the ultrasonic transducer.

2. The ultrasonic cleaner according to claim 1,
wherein a sum of the height of the cleaning solution stored in the cleaning tank and a distance from a bottom surface of the cleaning tank to the air layer or the metallic member is set to an integer times ¼ of the wavelength obtained by the sound velocity and the frequency driving the ultrasonic transducer.

3. The ultrasonic cleaner according to claim 2, further comprising: a liquid receiver which contacts a part or an entire periphery of a side wall of the cleaning tank, wherein the maximum height of the cleaning solution stored in the cleaning tank is determined by a height of an upper end of the side wall of the cleaning tank contacting the liquid receiver from the bottom surface of the cleaning tank.

4. The ultrasonic cleaner according to claim 3, further comprising:
a pipe which supplies a cleaning solution to the cleaning tank,
wherein the pipe is opened to an area formed by projecting the vibration head in the vertical direction in the bottom surface of the cleaning tank, and
wherein the air layer or the metallic member is disposed in the periphery of the pipe.

5. The ultrasonic cleaner according to claim 2,
wherein a hole is provided in an area formed by projecting the cylindrical hole of the tip portion of the vibration head in the vertical direction in the bottom surface of the cleaning tank.

6. The ultrasonic cleaner according to claim 2,
wherein the bottom surface of the cleaning tank is provided with a slant hole of which a bottom surface is inclined with respect to the bottom surface of the cleaning tank, and
wherein an air layer having a top surface parallel to the bottom surface of the slant hole or a metallic member provided along a surface parallel to the bottom surface of the slant hole is provided under the slant hole.

7. The ultrasonic cleaner according to claim 4, further comprising: a water discharge pipe which is provided in a side surface of the cleaning tank to supply water for cleaning the cleaning tank.

8. The ultrasonic cleaner according to claim 4, further comprising:
a cover which is provided at the upper end of the side wall of the cleaning tank,
wherein a hole which allows the cleaning solution to overflow is provided at a position not overlapping the tip portion of the vibration head in the cover.

9. An ultrasonic cleaner for cleaning a nozzle of a sample dispensing mechanism comprising:
a cleaning tank configured to store a cleaning solution;
an ultrasonic transducer configured to produce an ultrasonic wave;
a vibration head which extends from the ultrasonic transducer toward the cleaning tank and of which a tip portion is positioned in the cleaning tank and includes a cylindrical hole configured to receive the nozzle, the cylindrical hole having a longitudinal direction aligned to a vertical direction; and
a control unit configured to drive the ultrasonic transducer is driven at a frequency at which the vibration head is vibrated resonantly in a vibration mode accompanied by a deformation in a direction perpendicular to the longitudinal direction of the cylindrical hole,
wherein the cleaning tank is formed of a material mainly including a resin and configured to be transparent to the ultrasonic wave, and
wherein an air layer or a metallic member is provided inside the cleaning tank at a distance of an integer times ¼ of a wavelength determined by a sound velocity and a frequency driving the ultrasonic transducer from an area which is an antinode of the ultrasonic wave generated by the resonant vibration of the vibration head through a cleaning tank portion in the deformation direction of the vibration head when the vibration head is vibrated resonantly.

10. The ultrasonic cleaner according to claim 9, further comprising:
a liquid receiver which contacts a part or an entire periphery of a side wall formed of a material mainly including the resin of the cleaning tank,
wherein the ultrasonic transducer is driven at a frequency at which the vibration head is vibrated resonantly in a vibration mode accompanied by a deformation in a direction perpendicular to the longitudinal direction of the cylindrical hole, and
wherein an air layer of the liquid receiver is located at a distance of an integer times ¼ of a wavelength obtained by a sound velocity and a frequency driving the ultrasonic transducer from an area which is an antinode of an ultrasonic wave generated by the resonant vibration of the vibration head.

11. The ultrasonic cleaner according to claim 9,
wherein the ultrasonic transducer is driven at a frequency at which the vibration head is vibrated resonantly in a vibration mode accompanied by a deformation in the longitudinal direction of the cylindrical hole and a direction perpendicular to the longitudinal direction,
wherein an area formed by projecting at least the vibration head in the vertical direction in a bottom portion of the cleaning tank is formed of the material mainly including a resin, and
wherein the air layer or the metallic member is provided at a distance of an integer times ¼ of a wavelength obtained by a sound velocity and a frequency driving the ultrasonic transducer from an area which is an antinode of an ultrasonic vibration generated by the resonance vibration of the vibration head in an area formed by projecting at least the vibration head in the vertical direction under the cleaning tank.

12. The ultrasonic cleaner according to claim 9, further comprising: a water discharge pipe which is provided in a side surface of the cleaning tank to supply water for cleaning the cleaning tank.

13. An automatic analyzer comprising: the ultrasonic cleaner according to claim 1;
a sample dispensing mechanism which includes a nozzle sucking a sample;
a measurement unit configured to photometry on the mixture of the sample and the reagent contained in a reaction cell; and
the control unit configured to further control the measurement unit and the sample dispensing mechanism,
wherein the control unit cleans the nozzle by inserting the nozzle into the cylindrical hole of the vibration head of the ultrasonic cleaner and driving the ultrasonic transducer of the ultrasonic cleaner at the frequency.

14. An automatic analyzer comprising: the ultrasonic cleaner according to claim 7;
a sample dispensing mechanism which includes a nozzle sucking a sample;
a measurement unit configured to photometry on the mixture of the sample and the reagent contained in a reaction cell; and
the control unit configured to further control the measurement unit and the sample dispensing mechanism,
wherein water is discharged from a tube provided at a side surface of the cleaning tank toward the vibration head of the ultrasonic cleaner at a timing other than an inspection mode to clean the vibration head.

15. An automatic analyzer comprising: the ultrasonic cleaner according to claim 12;
a sample dispensing mechanism which includes a nozzle sucking a sample;
a measurement unit configured to photometry on the mixture of the sample and the reagent contained in a reaction cell; and
the control unit configured to further control the measurement unit and the sample dispensing mechanism,
wherein water is discharged from a tube provided at a side surface of the cleaning tank toward the vibration head of the ultrasonic cleaner at a timing other than an inspection mode to clean the vibration head.

16. An automatic analyzer comprising: the ultrasonic cleaner according to claim 9;
a sample dispensing mechanism which includes a nozzle sucking a sample;
a measurement unit configured to photometry on the mixture of the sample and the reagent contained in a reaction cell; and
the control unit configured to further control the measurement unit and the sample dispensing mechanism, wherein the control unit cleans the nozzle by inserting the nozzle into the cylindrical hole of the vibration head of the ultrasonic cleaner and driving the ultrasonic transducer of the ultrasonic cleaner at the frequency.

* * * * *